United States Patent [19]

Frederick

[11] Patent Number: 5,485,212
[45] Date of Patent: Jan. 16, 1996

[54] SOFTWARE VIDEO COMPRESSION FOR TELECONFERENCING

[75] Inventor: Ronald A. Frederick, Mountain View, Calif.

[73] Assignee: Xerox Corporation, Stamford, Conn.

[21] Appl. No.: 146,761

[22] Filed: Nov. 2, 1993

[51] Int. Cl.$^6$ ....................................................... H04N 7/36
[52] U.S. Cl. .......................................... 348/415; 348/420
[58] Field of Search ...................................... 348/400, 384, 348/390, 420, 409, 415; H04N 7/133, 7/137, 7/36

[56] References Cited

U.S. PATENT DOCUMENTS

| | | | |
|---|---|---|---|
| 5,347,311 | 9/1994 | Golin | 348/420 |
| 5,392,072 | 2/1995 | Rodriguez | 348/384 |

OTHER PUBLICATIONS

"The JPEG Still Picture Compression Standard", Gregory K. Wallace 1991.

*Primary Examiner*—Howard W. Britton
*Attorney, Agent, or Firm*—Rosen, Dainow & Jacobs

[57] ABSTRACT

In a method and apparatus for producing a signal for transmission to a receiver, a video signal is converted to digital form and the data of sequential frames of the signal are arranged in a plurality of blocks of pixel data that numerically represent visual characteristics of the respective pixels of the frame image. Each block is further organized as a matrix of pixel data. The pixel data of the blocks of a "previous" video frame, and a current video frame, are stored in a memory. A row of each block of the current video signal is compared with the corresponding row of the previous video frame, and a list is made of blocks in which the averages of the pixel data exceed a predetermined threshold. The pixel data of the listed blocks with lossy compression, and is encoded for transmission along with high definition data of a predetermined number of blocks of unchanged data. The data of the "previous" frame stored in memory is updated in memory, to continually store a replica of an image that corresponds to the image that should be currently stored in the receiving station.

11 Claims, 5 Drawing Sheets

Sample 32x24 image fragment broken
into a 4x3 group of 8x8 blocks

ORIGINAL ROW

| $X_0$ | $X_1$ | $X_2$ | $X_3$ | $X_4$ | $X_5$ | $X_6$ | $X_7$ |

FIG. 5a

TRANSFORMED ROW

| dc | i | $j_0$ | $j_1$ | $k_0$ | $k_1$ | $k_2$ | $k_3$ |

SOFTWARE VIDEO COMPRESSION FOR TELECONFERENCING

FIELD OF THE INVENTION

This invention relates to a method and apparatus for the processing, transmission and reception of signals, and is in particular directed to the compression, transmission and reception of video signals in a teleconferencing environment.

BACKGROUND OF THE INVENTION

It is known that video workstations can be outfitted with video capture hardware in an inexpensive manner. Combined with audio hardware that is already available, such systems are capable of video conferencing.

In order to render such techniques practical, however, it is necessary to compress the video signals by a large factor, such as 20:1, and it is necessary to effect such compression in real time. It is of course preferable that compression of the signals at a transmitting station, and decompression of the signals at a receiving station, be effected without the necessity of additional equipment.

Video compression techniques generally use two strategies to reduce the amount of information that is needed to represent a moving image. The first of these techniques takes advantage of the similarities between consecutive frames of an image, and effects the transmission only of signals corresponding to portions of the picture that have changed. The second technique effects the encoding of signals corresponding to portions of the image that have changed, and the transmission only of the encoded pixels, in order to minimize the time required for the transmission of data.

It is advantageous in many cases to compress video signals by "lossy" compression techniques. Such techniques enable the attainment of an increased compression ratio. Such lossy compression techniques are disclosed, for example, in the article "The JPEG Still Picture Compression Standard", Gregory K. Wallace et al, submitted in December 1991 for publication in the IEEE Transactions on Consumer Electronics, as well as a paper by the same name, and of the same authors, that appeared in the April 1991 issue of Communications of the ACM.

Since some aspects of the preferred compression technique in accordance with the present invention differ, in part, from the JPEG (Joint Photographics Experts Group) standard discussed in the above publications, a discussion of the compression techniques in accordance with the invention will be presented only in following disclosure of the invention.

It will be understood, however, that, generically, the term "lossy" compression refers to compression techniques wherein, although data may be lost in the process of compression, an increased compression ratio is obtained.

SUMMARY OF THE INVENTION

It is the object of the present invention to provide a method and apparatus for processing signals, especially video signals, in a manner to provide for practical video conferencing.

Briefly stated, in accordance with one aspect of the invention, a method and apparatus is provided for producing a signal for transmission to a receiver, wherein the signal to be transmitted corresponds to an input video signal or the like, and changes in pixel information in sequential frames of the input video signal. The video signal converted to digital form by conventional techniques, and the data of sequential frames of the signal are arranged in a plurality of blocks of pixel data that numerically represent visual characteristics of the respective pixels of the frame image. Each block is further organized as a matrix of pixel data.

The pixel data of the blocks of a "previous" video frame are stored in a memory. The "previous" video frame may constitute an earlier received frame that has been updated in order to reflect changes in the pixel data that has already been transmitted to the receiver. Corresponding blocks of a currently received frame video signals from the video source are also stored. A row (or column) of each block of the current video signal is compared with the corresponding row (or column) of the previous video frame, and when a comparison reveals that changes in any block exceed a predetermined threshold, that block is listed as a "changed" block. While only one row of each block is compared in the processing of each current, in order to minimize the processing time, other rows of the respective blocks are sequentially compared in the processing of subsequent video framed.

The pixel data of the blocks that have been listed as being "changed" blocks is compressed, with lossy compression, and the time that is required to transmit all of the thus compressed blocks is determined. In addition, a number blocks that were not indicated to be changed are also selected that may be transmitted with high definition in a time period that is a predetermined percent of the time that will be required to transmit the compressed blocks. Such high definition blocks are compressed, but a lossless compression is employed in this case. The compressed block data and the selected block data are then encoded by conventional techniques and transmitted to the receiver.

The selection of the unchanged blocks for transmission is preferably based upon the length of time that the data of these blocks have been stored without having been transmitted to the receiver.

The data of the "previous" frame stored in memory is then updated in memory, for comparison with the next current frame, by making all of the changes in the data that correspond to changed data information transmitted to the receiver, so the transmitter continually stores a frame that corresponds to the frame that should have been stored at the receiver.

BRIEF FIGURE DESCRIPTION

In order that the invention may be more clearly understood, it will now be disclosed in greater detail with reference to the accompanying drawings, wherein:

FIGS. 5a and 5b represent the data in the original row and the transformed row, respectively, in one lossy compression step in accordance with the invention.

DISCLOSURE OF PREFERRED EMBODIMENTS OF THE INVENTION

Figure 1:
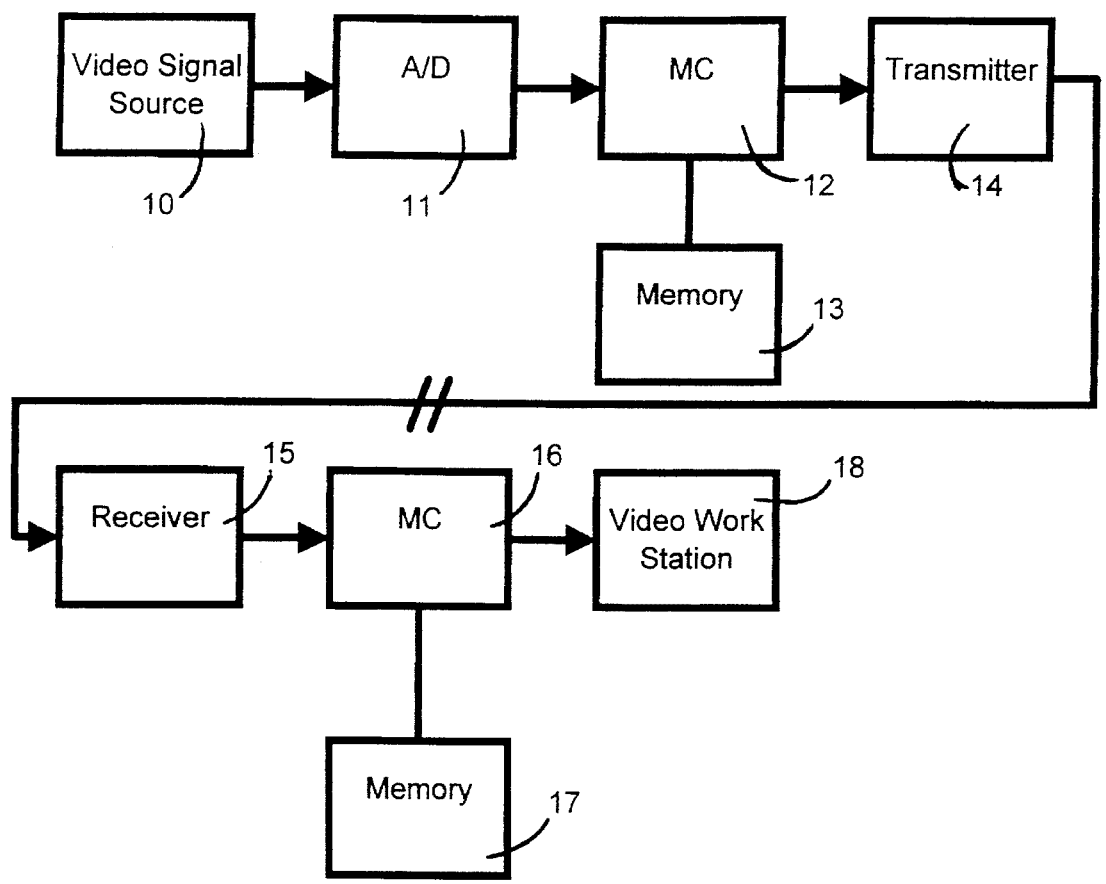
FIG. 1 is a block diagram of a system that may be employed in accordance with the invention.

A system that may incorporate the method and apparatus of the present invention is illustrated in FIG. 1. This system may constitute, for example, a teleconferencing system. As illustrated, video signals output from a source 10 of video signals at one station, for example generated by a video camera, are converted to digital signals in an analog to digital converter 11, and the digitized signals are applied to a microcomputer 12 for processing. The microcomputer may be a currently available PC. The microcomputer 12 has a memory 13. The processed output of the microcomputer is transmitted to a second station, for example via a transmitter 14, and received at the second station by a receiver 15. The received signals are applied to a second microcomputer 16 for decoding and further processing, and the processed signals are applied to a video work station 18.

Figure 2:
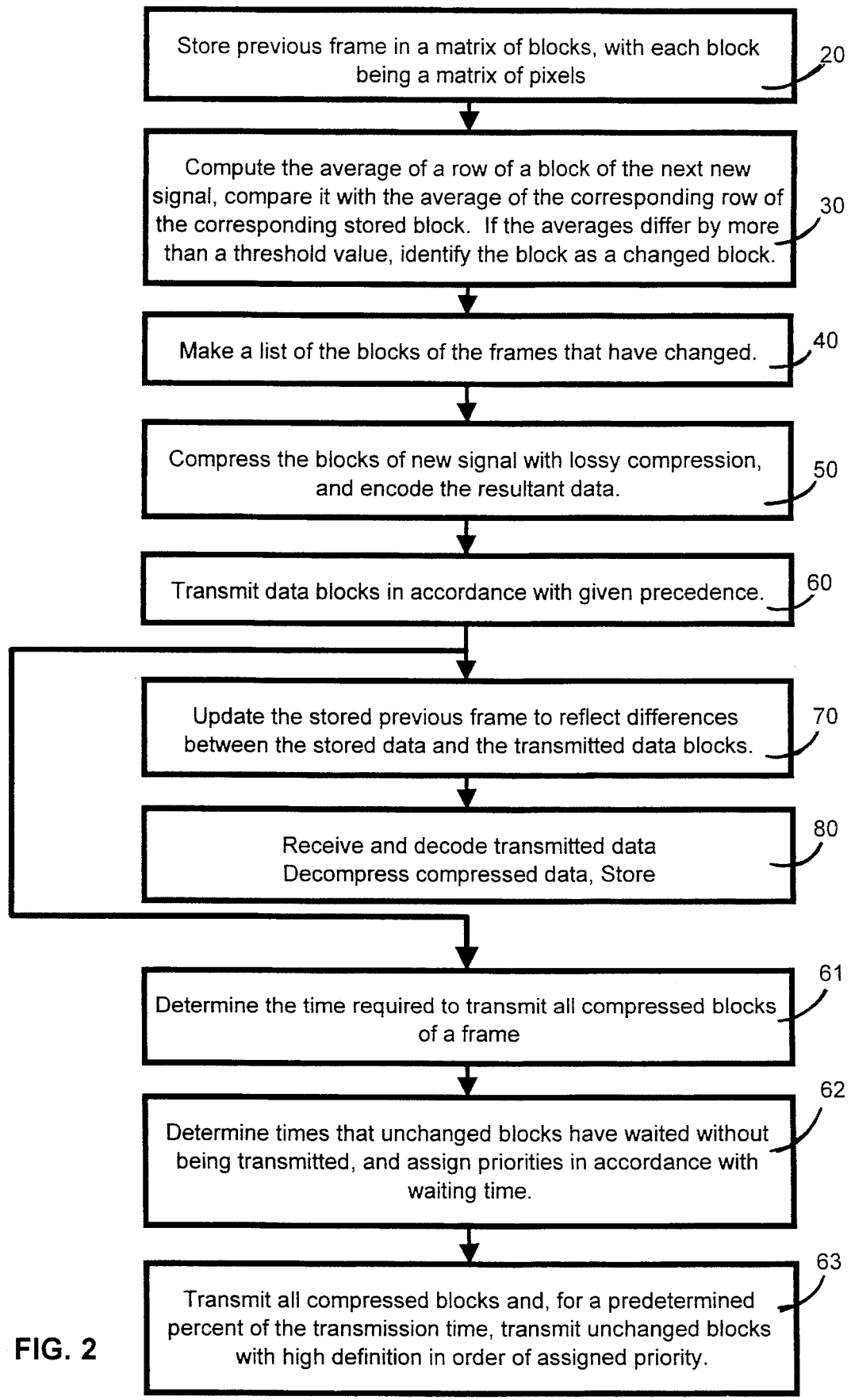
FIG. 2 is a flow diagram of the processing of signals in accordance with the invention.

A method for processing the digital signals received by microcomputer 12, in accordance with one embodiment of the invention, is illustrated in the flow diagram of FIG. 2. In this method, a frame of the received signals is stored in the memory 13, at block 20. The stored frame may be an initial frame received from the signal source, or it may be comprised of an earlier received frame that has been updated in accordance with "changes" that have been subsequently transmitted from the transmitter to the receiver. This stored frame, denoted the "previous" frame in the illustration to include frames of the above type, represents the pixels of an image that the transmitter "believes" is stored in the receiver, on the basis of the data that the transmitter has transmitted to the receiver.

Figure 3:
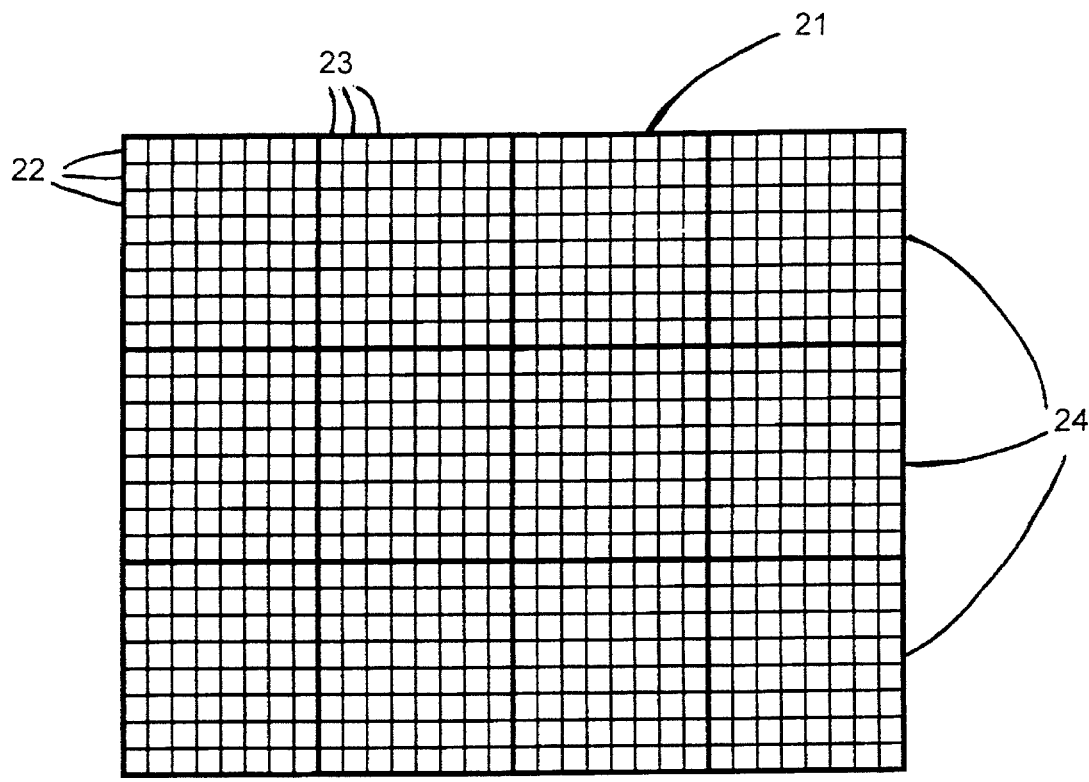
FIG. 3 illustrates an organization of pixels of a video frame.
Figure 4:
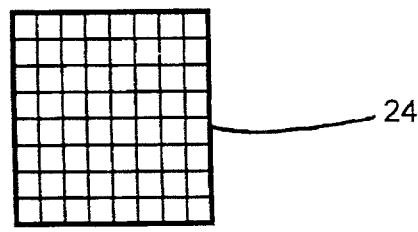
FIG. 4 illustrates an organization of pixels of a block of the video frame of FIG. 3.

The video signals are stored in the memory 13 in a matrix of a plurality of separate blocks, each block being comprised of a matrix of pixels, the matrices of blocks and pixels having defined rows and columns. It will be understood of course that the reference herein to the storage of a "matrix" refers to an arrangement wherein the data is stored and accessed in a manner permitting convenient mathematical processing of matrix structures, and does not allude to any particular relative locations of storage of the various pixels. As example of the storage of data, FIG. 3 illustrates a video image 21 having 24 rows 22 of pixels and 32 columns 23 of pixels. This image is separated into a 12 "blocks" 24 of pixels, each block having 8 rows and 8 columns of pixels, as illustrated in FIG. 4. It will be understood, of course, that the invention is not limited to the specific number of row and columns of pixels in the frames and blocks discussed above. (In an actual embodiment of a system in accordance with the invention, the system employed about 100 times as many pixels as illustrated in the embodiment of FIG. 4).

The data stored in the memory 13 corresponding to each pixel is a number corresponding to the "color" of the respective pixel.

Following the storage of the "previous" frame, a "new" frame of the video signal is received from the source 10. This frame is preferably processed and stored in the manner discussed above with respect to the "previous" frame, so that the new frame has blocks of rows and columns of pixels that correspond to those of the previous frame, with respect to their locations in the respective images.

Referring again to FIG. 2, at step 30, the average of the numbers stored at the pixel locations of a row of each block is computed, for the new frame, and compared with the average of the numbers stored at the pixel locations of the corresponding row of the corresponding block of the previous frame. That is, a comparison is made only with respect to a limited number of rows of each of the blocks, preferably one row, during the process of determining data that is to be transmitted in response to each new frame. The different rows of each block are sequentially compared in the processing of subsequent frames, so that, in the above example of the invention, the average of the pixels of each row of a block is compared once every eight frames. The sequence of comparison of the different rows of a block, however, is not limited to this example. It is also apparent that the comparisons at this step of the method may alternatively be made with respect to columns, rather than rows, of the blocks. This technique of considering only one row of a block, for each frame, increases the speed of processing of the data, and does not have any noticeable effect on the image reproduced at the receiving station.

The comparisons of the averages of the rows of the two frames is compared with a threshold value, to identify those blocks wherein the greatest changes have occurred from the previous frame to the new frame. The threshold value for this comparison is preferably set to avoid indicating that any block has changed if the change would not be readily apparent to a viewer of the image reproduces at the receiving station.

As seen at step 40, in FIG. 2, a list is made of the blocks that have been identified as changed blocks of the new frame, and, at step 50, only the thus identified blocks of the new frame are compressed and encoded. The compression is effected with a lossy compression technique, a specific embodiment of which will discussed in the following paragraphs. The data blocks are now transmitted to the receiving station, as indicated at step 60, such transmission including the transmission of at least some of the blocks that had not been indicated to have been changed blocks, in a manner that will be more fully discussed, as well as encoding of all of the data that is transmitted.

As indicated at step 70, the data stored in the memory 13 that constituted the "previous" frame, is now updated to reflect changes in the pixel data in accordance with the data that has been transmitted to the receiving station. Thus, the transmitting station continually stores frame data that corresponds to the pixel data that has been transmitted to the receiving station. Since data corresponding to blocks hat were determined to be unchanged is also transmitted to the receiving station during each transmission, in accordance with a predetermined precedence, as will be discussed, it is assured that the "previous" frame data stored in the memory 13 reasonably accurately corresponds to the image that is actually reproduced at the receiving station.

It is to be noted that the transmitted data, for the blocks that are transmitted, includes headers in order to enable the receiving station to identify the signals and properly orient them in the reproduced image.

In the receiving station, the transmitted data is received, at step 80, and decoded by the microcomputer 16. The microcomputer then updates the data stored in the memory 17, with respect to the unchanged blocks of data that were received, and decompresses and stores the data of the changed blocks, and displays the resultant image.

FIG. 3 also illustrates the transmission of data in accordance with a preferred embodiment of the invention. In accordance with the invention, all of the compressed data, i.e. the data of the blocks that had been identified as changed, as well as the data of at least some of the blocks that have not been identified as being changed, is transmitted in a given transmission sequence. Thus, as illustrated in FIG. 3, after the changed blocks have been identified, the time that will be required to transmit these blocks, in compressed and encoded form, is determined, at block 61. The steps of assigning priorities for transmission and of transmitting blocks are shown at blocks 62 and 63, as described further below. Transmission of this data, for each frame, will be assigned to a predetermined proportion, for example 80%, of each transmission sequence. Data relating to blocks that have not been identified as changed data is transmitted during the remaining proportion of the transmission sequence, in accordance with a predetermined precedence. For example, in accordance with this precedence, data of blocks may be transmitted sequentially, in accordance with their position on the matrix of the stored video signals, if data of the corresponding block has not been transmitted to the receiver for a predetermined time. As a consequence, over a period of time it is assured that data corresponding to each block of the video signals has been transmitted to the receiving station. If data relating to any block of the image is not transmitted during a given sequence, its waiting time will be increased, to ensure its eventual transmission during a later sequence.

When data related to blocks that have not been indicated to be changed is transmitted, it is transmitted with high definition, i.e. without lossy compression, although it is encoded, as above discussed.

As is apparent, the microcomputer 12 stores, in the memory, the following data in addition to the pixel data of the previous frame and the current frame:

1. A list of all of the blocks that have changed from the "previous" frame.

2. A list showing how long a time has passed since the last transmission of each block.

3. A list of the number of bytes in the changed blocks, in order to enable a determination of the time that will be required to transmit data corresponding to these blocks.

4. A comparison of the age of the blocks with the oldest block, in order to determine whether data of an unchanged block should be transmitted.

In the lossy compression method of the data of a block of data in accordance with a preferred embodiment of the invention, each row (or column) of the block is considered separately to develop a new set of numbers for that row (or column), and then each column (or row) is considered separately, using the new numbers, to develop a second new set of 64 numbers. These latter numbers are encoded by conventional run length encoding, in the above described encoding step. The object of this technique is to provide as many zeros, or numbers close to zero, as possible, in order to simplify the encoding of data and as well as to reduce the amount of data that need be transmitted, since zero and numbers close to zero can be coded more compactly in the encoding of the data.

For example, in the preferred compression technique of the invention, and still considering that each block defines an 8×8 matrix, hereinafter referred to as the original matrix, the average value of the numbers in each row is determined, and assigned to the first element of a corresponding row of a first substitute matrix. The second element position of the first substitute matrix is half of the difference between the the averages of the first four, and second (last) four, elements of the original matrix. The number for the third element position is half of the difference between the average of the first two and second two numbers of the original matrix. The number for the fourth element position is half of the difference between the averages of the third two and fourth (last) two numbers of the original matrix. The remaining four element positions are determined by pairing adjacent numbers of the original matrix and calculating half of the difference of such adjacent numbers.

Figure 5:
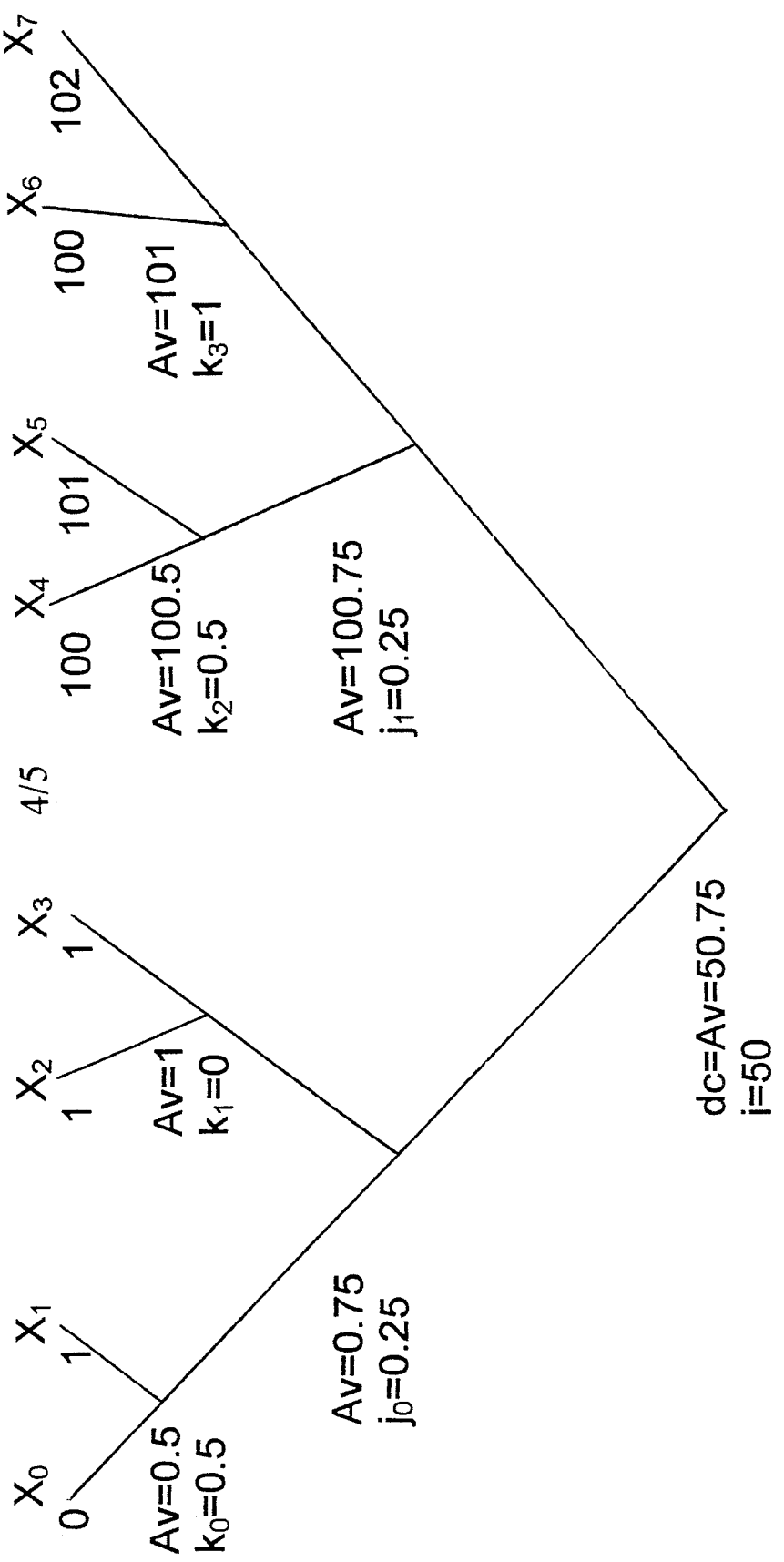
FIG. 5 illustrates the calculation of data for compressing blocks, in accordance with a preferred embodiment of the invention.

This is more clearly understood by reference to FIGS. 5, 5a and 5b. As illustrated in FIG. 5a, the original data in the respective row of the matrix is $x_0$–$x_7$, respectively. In order to simplify the explanation of the invention, FIG. 5 assumes that the values of this data are 0, 1, 1, 1, 100, 101, 100 and 102, respectively. Pairing these numbers, half of the difference of each pair produces 0.5, 0, 0.5 and 1, respectively. These latter numbers are identified as the variables , $k_0$, $k_1$, $k_2$ and $k_3$, respectively. The averages of the pairs of numbers are 0.5, 1, 100.5 and 101, respectively. Proceeding to the next step, the resultant four averages are paired, and half of the difference of these pairs produces the numbers $j_0$=0.25 and $j_1$=0.25. The averages of each of these latter paired numbers is 0.75 and 100.75. The variable i=50 is now determined as one half the difference between the latter paired numbers, and their average is 50.75. This latter average, the dc value, is inserted at the first element position of the row of the transformed row, as illustrated in FIG. 5b, and to the remaining elements are assigned the variables i, $j_0$, $j_1$, $k_0$, $k_1$, $k_2$ and $k_3$, in that order.

This procedure is followed for each row of the original matrix, to complete the calculation of the first substitute matrix. The process is then repeated for each column of the first substitute matrix, to provide a second substitute matrix.

It will be noted that the upper left cell of the second substitute matrix is the average of the entire matrix, the upper right cell stores a number corresponding to the high resolution of the matrix in the horizontal direction, the lower left cell stores a number corresponding to the high resolution of the matrix in the vertical direction, and the number in the lower right cell corresponds to the overall high resolution of the image represent by the matrix. It is further to be noted that a large number of the elements stored in the second substitute matrix are either zero or very low. Since zero and low numbers are converted to zero in the case of lossy compression, runs of zeros can be encoded very compactly by the run length encoding.

While, as above discussed, there are some similarities between the compression in accordance with the invention and compression in accordance with the JPEG, the JPEG standard arranges calculated data in a matrix in a manner different than in accordance with the invention, and the JPEG standard calculates the numbers to be encoded and transmitted in manner different than the present invention.

The 64 numbers obtained by this technique, i.e. the numbers in the rows and columns of the second substitute matrix, are then encoded by conventional run length encoding techniques for transmission.

The compression of the 8×8 blocks in this manner thereby employs a wavelet compression technique. The basic compression strategy is one dimensional, first horizontally and then vertically. It takes the pixels, in any given row, for example, and turns that data into a pyramid structure. The apex of the pyramid (i.e. the bottom as illustrated in FIG. 5) corresponds to the average of the pixels, and proceeding toward the base of the pyramid, the differences are taken with respect to the averages of smaller pairs of numbers.

While the invention has been disclosed and described with reference to a limited number of embodiments, it will be apparent that variations and modifications may be made therein, and it is therefor the aim of the present invention to cover each such variation and modification as falls within the true spirit and scope of the invention.

What is claimed is:

1. A computer-implemented method for producing a video signal for transmission, in a system having a source of a first video signal comprised of sequential frames of signals, comprising transmitting video signals at least partially with lossy compression, corresponding to a sequence of said sequential frames of signals;

storing a frame of signals corresponding to a composite of signals that have been transmitted in said step of transmitting video signals corresponding to a sequence of sequential frames;

comparing blocks of said stored frame of signals with corresponding blocks of a video frame that occurs subsequent said sequence;

identifying blocks of said stored frame that differ in information content from blocks of said video frame by more than a predetermined extent;

transmitting said identified blocks of said video frame with lossy compression; and modifying blocks of said stored frame to conform to data of said identified blocks of data transmitted in said step of transmitting with lossy compression.

2. The method of claim 1 further comprising determining the time required for transmitting said identified blocks with lossy compression; and transmitting data of said blocks of said video frame that were not identified in said step of comparing for a duration corresponding to a predetermined proportion of said determined time.

3. A computer-implemented method for producing a video signal for transmission, in a system having a source of a first video signal comprised of sequential frames of signals, each frame being comprised of pixel signals numerically representing visual characteristics of separate pixels of the respective frame: comprising storing pixel signals of a plurality of separate first blocks of a first frame of video signals to define a plurality of separate n×m matrices of first pixel signals representing rows and columns, respectively, of a respective block of said first frame, wherein n and m are integers;

storing a plurality of second blocks of pixel signals of a frame of second video signals corresponding to a frame of said first video signal to define a plurality of separate second n×m matrices of said second pixel signals, representing rows and columns, respectively, of a respective block of said frame of said second video signal, each second pixel signal numerically representing a characteristic of a pixel of said second video signal;

whereby each block of said first frame corresponds to a separate block of said frame of said second video signal;

comparing the average of the numerical values of a predetermined row or column of each of said first blocks with the average of the numerical values of the corresponding row or column of the corresponding second blocks, and, in response thereto, identifying all of said first blocks whose average value, for the predetermined row or column, differs from the average value of the corresponding row or column of the corresponding second block by a predetermined threshold;

compressing only the pixel signals of said identified first blocks;

encoding said compressed pixel signals and pixel signals of blocks that were not identified during said step of comparing; and transmitting said encoded compressed pixel signals and at least some of said encoded signals that were not identified during said step of comparing during a continuous transmission sequence.

4. The method of claim 3 wherein said step of compressing comprises compressing with lossy compression.

5. The method of claim 3 wherein said step of transmitting comprises determining a first time duration required to transmit said encoded compressed pixel signals for a given frame, selecting a group of said encoded signals that were not identified during said step of comparing that can be transmitted in a second time duration that is a predetermined proportion of said first time, and sequentially transmitting said encoded compressed pixel signals and selected signals in a time period of duration equal to the sum of said first and second time durations.

6. An apparatus for transmitting a video signal corresponding to a first video signal comprised of sequential frames of signals, comprising, under the control of a computer:

means for transmitting video signals, at least partially with lossy compression, corresponding to a sequence of said sequential frames of signals;

means for storing a frame of signals corresponding to a composite of signals that have been transmitted, corresponding to a sequence of sequential frames;

means for comparing blocks of said stored frame of signals with corresponding blocks of a video frame that occurs subsequent said sequence;

means for identifying blocks of said stored frame that differ in information content from blocks of said video frame by more than a predetermined extent and applying said identified blocks to said transmitting mean; and means for modifying blocks or said stored frame to conform to data of said identified blocks of data transmitted by said transmitting means with lossy compression.

7. The apparatus of claim 6 further comprising means for determining the time required for transmitting said identified blocks with lossy compression; and mean applying data of blocks that had not been identified to said transmitting means or transmitting said data of unidentified blocks for a duration corresponding to a predetermined proportion of said determined time.

8. An apparatus for transmitting a video signal, comprising under the control of a computer:

a source of a first video signal comprised of sequential frames of signals, each fame being comprised of pixel signals numerically representing visual characteristics of separate pixels of the respective frame;

means storing pixel signals of a plurality of separate first blocks of a first frame of video signals to define a plurality of separate first n×m matrices of first pixel signals representing rows and columns, respectively, of a respective block of said first frame, wherein n and m are integers;

means storing a plurality of second blocks of pixel signals of a frame of second video signal corresponding to a frame of said sequential frames of signals, to define a plurality of separate second n×m matrices of said second pixel signals, representing rows and columns, respectively, of a respective block of said frame of said second video signal, each second pixel signal numerically representing a characteristic of a pixel of said second video signal;

whereby each block of said first frame corresponds to a separate block of said frame of said second video signal;

means for comparing the average of the numerical values of a predetermined row or column of each of said first blocks with the average of the numerical values of the corresponding row or column of the corresponding second blocks, and means for identifying all of said first blocks whose average value, for the predetermined row or column, differs from the average value of the corresponding row or column of the corresponding second block by a predetermined threshold;

means for compressing only the pixel signals of said identified first blocks;

means for encoding said compressed pixel signals and pixel signals of blocks that were not identified during said step of comparing; and means for transmitting said encoded compressed pixel signals and at least some of said encoded signals that were not identified during said step of comparing during a continuous transmission sequence.

9. The apparatus of claim 8 wherein said means for compressing comprises means for compressing with lossy compression.

10. The apparatus of claim 8 further comprising means for determining a first time duration required to transmit said encoded compressed pixel signals for a given frame, means for selecting a group of said encoded signals that were not identified during by said comparing means and that can be transmitted in a second time duration that is a predetermined proportion of said first time, said means for transmitting comprising means for sequentially transmitting said encoded compressed pixel signals and selected signals in a time period of duration equal to the sum of said first and second time durations.

11. In computer-implemented method for the lossy compression of sequentially occurring signals that numerically represent data, comprising arranging numbers corresponding to said data in separate cells of a matrix and transforming the numbers in each of said cells, the improvement wherein said step of transforming comprises:

storing, in separate cells in a row of said matrix, the average value of the numbers of said row of said matrix, half the differences of numbers stored in adjacent cells of said matrix, and half the differences of averages of numbers of adjacent groups of said cells of said row;

repeating said step of storing for each row and column of said matrix;

serially reading out the values of cells of said matrix and encoding said values by an encoding process which encodes compactly runs of zero and close to zero values to produce a new compressed signal of the sequentially occurring signals.

* * * * *